(12) United States Patent
Lim et al.

(10) Patent No.: US 12,105,194 B2
(45) Date of Patent: Oct. 1, 2024

(54) RADAR DEVICE AND ANTENNA DEVICE THEREFOR

(71) Applicant: HL Klemove Corp., Pyeongtaek-si (KR)

(72) Inventors: Hae Sueng Lim, Yongin-si (KR); Seong Hee Jeong, Yongin-si (KR); Yun Ki Han, Suwon-si (KR); Kyung Jin You, Anyang-si (KR)

(73) Assignee: HL KLEMOVE CORP., Incheon (KR)

( * ) Notice: Subject to any disclaimer, the term of this patent is extended or adjusted under 35 U.S.C. 154(b) by 379 days.

(21) Appl. No.: 17/617,800

(22) PCT Filed: Jun. 8, 2020

(86) PCT No.: PCT/KR2020/007400
§ 371 (c)(1),
(2) Date: Dec. 9, 2021

(87) PCT Pub. No.: WO2020/251229
PCT Pub. Date: Dec. 17, 2020

(65) Prior Publication Data
US 2022/0236407 A1 Jul. 28, 2022

(30) Foreign Application Priority Data

Jun. 11, 2019 (KR) .................. 10-2019-0068506

(51) Int. Cl.
*G01S 13/931* (2020.01)
*H01Q 1/24* (2006.01)
*H01Q 1/32* (2006.01)

(52) U.S. Cl.
CPC ............ *G01S 13/931* (2013.01); *H01Q 1/24* (2013.01); *H01Q 1/3233* (2013.01); *G01S 2013/93271* (2020.01); *G01S 2013/93272* (2020.01)

(58) Field of Classification Search
CPC ......... G01S 13/931; G01S 2013/93271; G01S 2013/93272; H01Q 1/24; H01Q 1/3233
See application file for complete search history.

(56) References Cited

U.S. PATENT DOCUMENTS

| 5,619,214 A * | 4/1997 | Lindenmeier ............ H01Q 1/32 343/704 |
| 2014/0191895 A1 * | 7/2014 | Binzer .................. G01S 13/878 342/59 |

(Continued)

FOREIGN PATENT DOCUMENTS

| KR | 10-1175745 B1 | 8/2012 |
| KR | 10-2013-0129591 A | 5/2016 |
| KR | 10-2018-0060341 A | 6/2018 |

OTHER PUBLICATIONS

International Search Report (PCT/ISA/210) issued in PCT Application No. PCT/KR2020/007400 dated Sep. 17, 2020 with English Translation.

(Continued)

*Primary Examiner* — Bernarr E Gregory
*Assistant Examiner* — Hailey R Le
(74) *Attorney, Agent, or Firm* — Harvest IP Law, LLP

(57) ABSTRACT

The present disclosure relates to a radar apparatus and antenna apparatus therefor. More specifically, the radar apparatus may include an antenna apparatus configuring to include a transmission antenna unit including two or more first transmission antennas mounted in the rear-side or front-side of a vehicle and arranged to be spaced apart from each other in the horizontal direction, each of which has a plurality of array antennas and a second transmission antenna having one array antenna disposed between the two or more first transmission antennas, and a receiving antenna unit including one or more receiving antennas; and a signal processor configuring to transmit a transmission signal (Continued)

through the transmission antenna unit, receive a reflection signal reflected from an object through the receiving antenna, and process the received reflection signal to acquire information about the object, and wherein the two or more first transmission antennas are tilted and arranged toward a driving axis of the vehicle at a position where the radar apparatus is mounted.

18 Claims, 12 Drawing Sheets

(56) References Cited

U.S. PATENT DOCUMENTS

| | | | |
|---|---|---|---|
| 2015/0268336 A1 | 9/2015 | Yukumatsu et al. | |
| 2016/0033632 A1* | 2/2016 | Searcy | G01S 13/424 |
| | | | 342/153 |
| 2017/0307744 A1 | 10/2017 | Loesch et al. | |
| 2018/0149735 A1* | 5/2018 | Lim | G01S 13/345 |
| 2019/0317207 A1* | 10/2019 | Schroder | G01S 13/325 |
| 2022/0163623 A1* | 5/2022 | Kishigami | H01Q 21/065 |

OTHER PUBLICATIONS

Written Opinion (PCT/ISA/237) issued in PCT Application No. PCT/KR2020/007400 dated Sep. 17, 2020.

* cited by examiner

RADAR DEVICE AND ANTENNA DEVICE THEREFOR

CROSS REFERENCE TO RELATED APPLICATION

This application is the U.S. National Phase under 35 U.S.C. § 371 of International Patent Application No. PCT/KR2020/007400, filed on Jun. 8, 2020, which claims priority from Korean Patent Application No. 10-2019-0068506, filed on Jun. 11, 2019, which is hereby incorporated by reference for all purposes as if fully set forth herein.

BACKGROUND OF THE INVENTION

1. Field of the Invention

The present disclosure relates to a radar apparatus and antenna apparatus therefor. More specifically, the present disclosure relates to a technique for accurately obtaining information about an object located at various distances.

2. Description of the Prior Art

The vehicle radar device is mounted on a vehicle and is used to assist the operation of the vehicle. Recently, as research on autonomous driving technology is progressing, it has been developed a technology for increasing the accuracy of recognition of a vehicle's surrounding environment. The radar devices for the vehicle may be mounted at various locations in the vehicle to accurately detect objects present in the environment around the vehicle. For example, a vehicle radar device may be mounted at a position such as a front or rear or a corner of the vehicle (front right, front left, rear right, rear left) to obtain information about an object present in the surrounding environment of the vehicle.

In particular, a corner radar mounted on a corner of the vehicle may be used for a blind spot detection (BSD) function enabling of providing a warning in detecting the object existing in a blind spot area. As functions required for fully autonomous driving technology are gradually diversified, the performance requirement for the corner radar is gradually increasing. In particular, in order to secure stable performance in implementing a vehicle lane change function, it is required to accurately detect the object existing at a short distance and a long distance in the surrounding and driving directions of the vehicle.

SUMMARY OF THE INVENTION

For this background, an object of the present disclosure is to provide an antenna apparatus and a radar apparatus including the antenna apparatus enabling of forming a long-range detection range with respect to the traveling direction of the vehicle and a wide short-distance detection range.

In accordance with an aspect of the present disclosure, there is provided a radar apparatus comprising: an antenna apparatus configuring to include a transmission antenna unit including two or more first transmission antennas mounted in the rear-side or front-side of a vehicle and arranged to be spaced apart from each other in the horizontal direction, each of which has a plurality of array antennas and a second transmission antenna having one array antenna disposed between the two or more first transmission antennas, and a receiving antenna unit including one or more receiving antennas; and a signal processor configuring to transmit a transmission signal through the transmission antenna unit, receive a reflection signal reflected from an object through the receiving antenna, and process the received reflection signal to acquire information about the object; wherein the two or more first transmission antennas are tilted and arranged toward a driving axis of the vehicle at a position where the radar apparatus is mounted.

In accordance with another aspect of the present disclosure, there is provided an antenna apparatus for a radar apparatus mounted in a rear-side or a front-side of a vehicle, the antenna apparatus comprising: a transmission antenna unit configuring to include two or more first transmission antennas spaced apart from each other in the horizontal direction, each of which includes a plurality of array antennas, and a second transmission antenna having one array antenna disposed between the two or more first transmission antennas; and a receiving antenna unit including one or more receiving antennas, wherein the two or more first transmission antennas are tilted and arranged toward a driving axis of the vehicle at a position where the radar apparatus is mounted.

According to the present disclosure, the present disclosure can provide the radar apparatus capable of assisting the driver's driving operation by accurately recognizing a vehicle's short-distance environment and a long-distance environment in the driving direction.

According to the present disclosure, the present disclosure can provide the radar apparatus capable of acquiring horizontal and vertical information on an object with high resolution.

DETAILED DESCRIPTION OF THE EXEMPLARY EMBODIMENTS

Figure 1A:
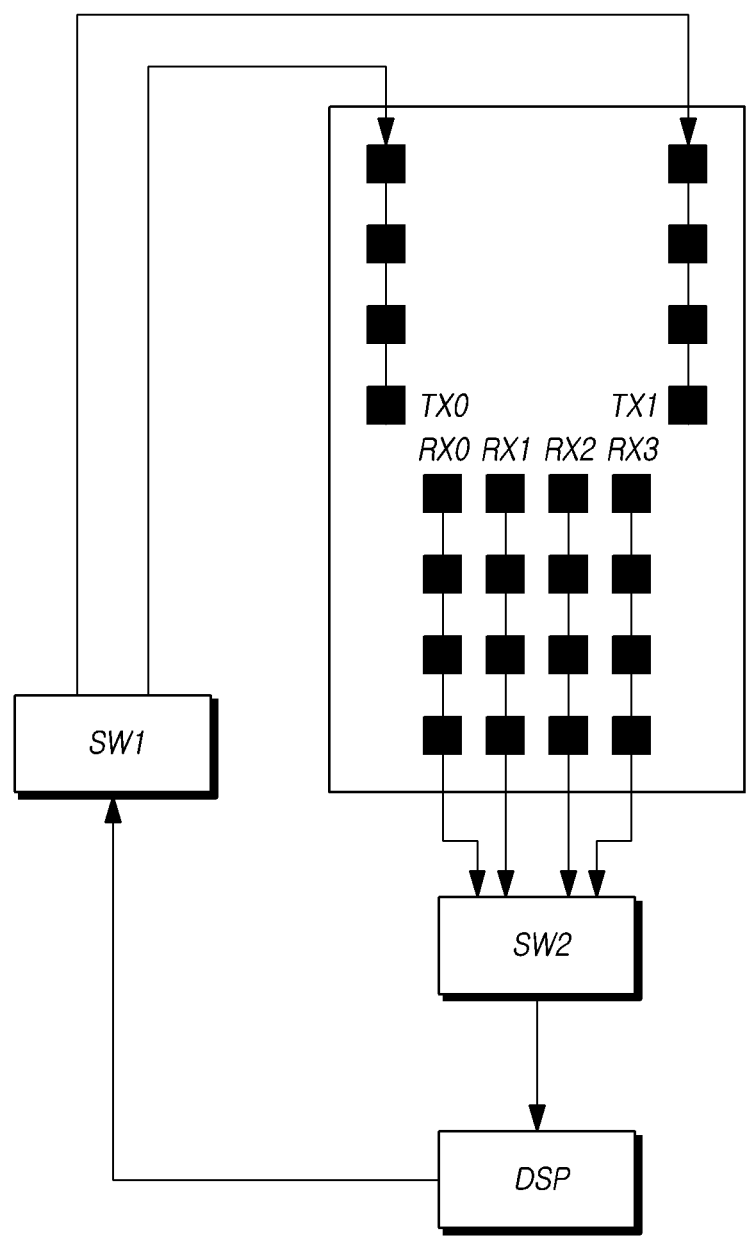
FIG. 1 illustrates an example of a general radar device having a multiple antenna.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

In the present disclosure, a vehicle may be a concept including an automobile, a motorcycle, and the like. In addition, the vehicle may be a concept including all of an internal combustion engine vehicle having an engine as a power source, a hybrid vehicle having an engine and an electric motor as a power source, an electric vehicle having an electric motor as a power source, and the like. Hereinafter, an automobile or a vehicle is described as an example.

In the following description, the front means the forward driving direction of the vehicle, and the rear means the backward driving direction of the vehicle. Further, the left side of the vehicle means the left side of the vehicle's forward running direction, and the right side of the vehicle means the right side of the vehicle's forward traveling direction. In addition, the driving direction of the vehicle means a direction perpendicular to the transverse axis of the vehicle, and may indicate the longitudinal direction of the vehicle.

Meanwhile, the radar device or the radar apparatus used in the present disclosure may include at least one radar sensor unit, for example, one or more of lateral detection radar sensors mounted on each side of the vehicle. The radar device (or radar sensor) analyzes a transmission signal and a receiving signal to process data, and accordingly, can detect information about an object, and may include an electronic control unit (ECU) or a processor for this function. Data transmission or signal communication from the radar sensor to the ECU can utilize a communication link such as a suitable vehicle network bus.

The radar device may include one or more transmission antennas for transmitting radar signals and one or more receiving antennas for receiving reflection signals reflected from objects. Meanwhile, the radar apparatus according to the present embodiment may utilize the multi-dimensional antenna array and a multiple input multiple output (MIMO) signal transmission-reception method to form a virtual antenna aperture larger than an actual antenna aperture.

Further, in another embodiment, the antennas in the radar device may be arranged in a two-dimensional antenna array, for example, each antenna patch has a Rhombus grid arrangement, thereby reducing unnecessary side lobes.

Alternatively, the two-dimensional antenna array may include a V-shape antenna array in which a plurality of radiation patches are arranged in a V-shape, and more specifically, may include two V-shape antenna arrays. At this case, a single feed may be performed at the apex of each V-shaped antenna array.

Alternatively, the two-dimensional antenna array may include an X-shape antenna array in which a plurality of radiation patches are arranged in an X-shape, and more specifically, may include two X-shape antenna arrays. At this case, a single feed may be provided to the center of each X-shaped antenna array.

In addition, the radar apparatus according to the present embodiment may use a MIMO antenna system in order to achieve a high detection accuracy or resolution in vertical and horizontal directions.

More specifically, each transmission antenna may transmit a signal having an independent waveform different from each other in a MIMO system. That is, each transmission antenna transmits a signal of an independent waveform differentiating from that for the other transmission antennas, and each receiving antenna may determine the transmission antenna transmitting the transmission signal correspondent with the received signal reflected from the target due to the different waveforms of these signals.

In addition, the radar apparatus according to the present embodiment may be configured to include a radar housing for accommodating a substrate and a circuit including the transmission antenna and the receiving antenna, and a radome forming the exterior of the radar housing.

The radome may be made of a material capable of reducing the attenuation of the radar signal transmitted and received, and the radome may be constituted as a part of an outer surface of the vehicle component such as the front bumper, the rear bumper, the grill of the vehicle and the side body of the vehicle.

The radome of the radar apparatus according to the present embodiment may be disposed inside a vehicle grill, a bumper, a vehicle body, and may be disposed as a part of the outer surface of a part of the vehicle body, as a result, it is possible to provide a convenience in mounting the radar sensor to the vehicle while improving the appearance of the vehicle.

FIG. 1 illustrates an example of a general radar device having a multiple antenna.

As shown in FIG. 1a, a radar apparatus has an antenna system in which two transmission antennas TX0 and TX1 are disposed in the same direction at the upper portion and four receiving antennas RX0-RX3 are disposed in the same direction at the lower portion. When a signal is to be transmitted, one transmission antenna is selected by a first switch SW1 and transmits a transmission signal. A receiving signal reflected from an object is received by one receiving antenna switched by a second switch SW2. A signal processor DSP can measure the distance from the object and the relative speed of the object by measuring a phase change, a magnitude change, a frequency difference etc. by amplifying a received reflection signal and comparing the amplified signal with the transmission signal. In FIG. 1a, the antennas are one-line array antennas.

Figure 1B:
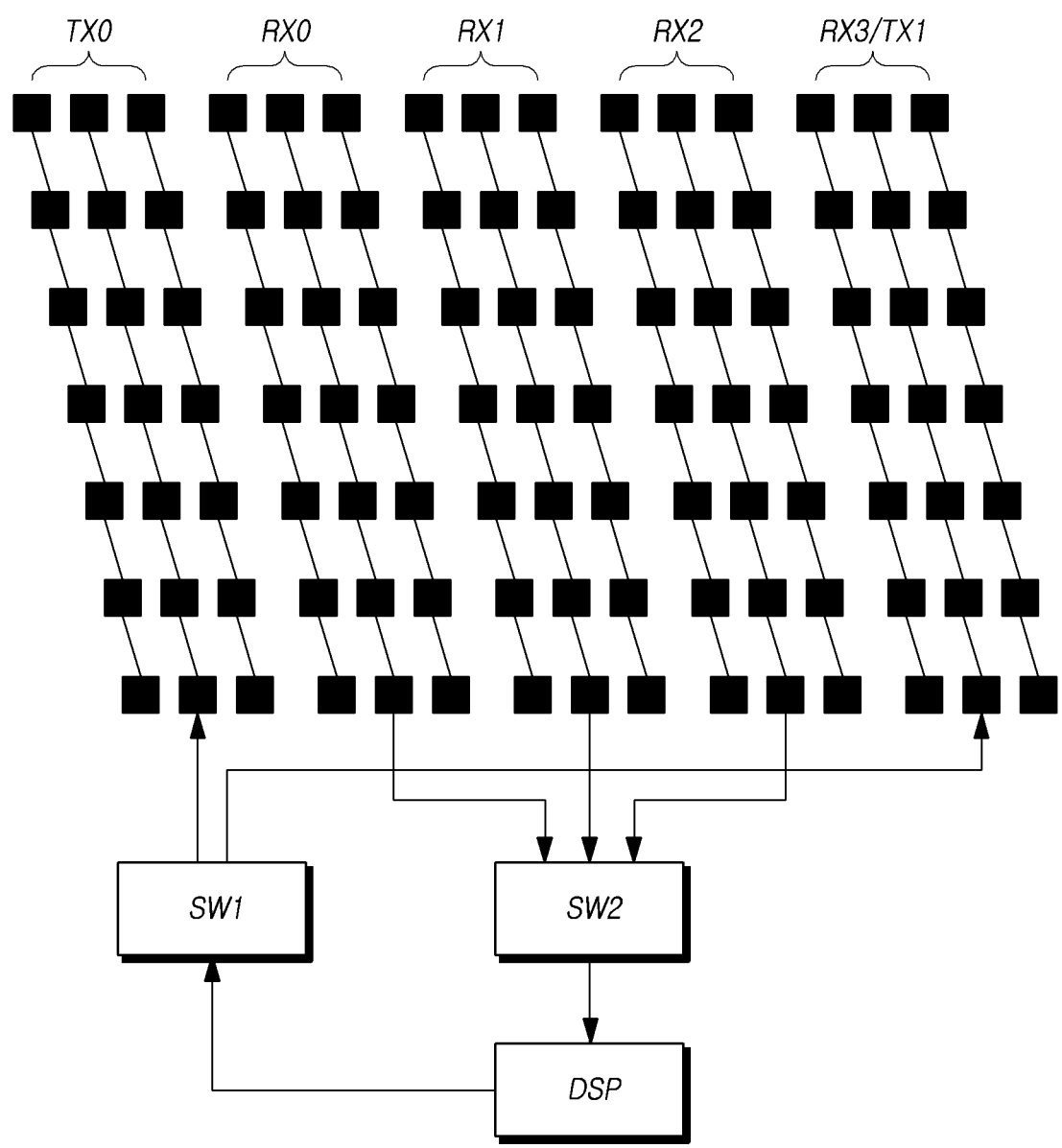

FIG. 1b shows an example of another multi-antennal radar apparatus, in which one transmission antenna TX0, a plurality of receiving antennas RX0-RX2, and one transmitting-receiving antenna RX3/TX1 are arranged with gaps therebetween and the antennas are elongated in the same directions. In this configuration, when a signal is to be transmitted, one of the transmission antenna TX0 and the transmitting-receiving antenna RX3/TX1 is selected by a first switch SW1 and transmits a transmission signal. A receiving signal reflected from an object is received by one of the receiving antennas RX0-RX2 and the transmitting-receiving antenna RX3/TX1 selected by a second switch SW2. A signal processor DSP can measure the distance from the object and the relative speed of the object by measuring a phase change, a magnitude change, a frequency difference etc. by amplifying a received reflection signal and comparing the amplified signal with the transmission signal.

Although the radar apparatus having the antenna system shown in FIG. 1 can perform medium/long range detection and short range detection, has difficulty in having sufficient resolution or angular resolving power in both of the medium/long range detection and short range detection.

Furthermore, when the radar device having an antenna structure as shown in FIG. 1 is mounted on a corner of the vehicle, the radar device may be installed to face an oblique direction with respect to the vehicle or a driving direction of the vehicle, so that there may be a disadvantage that the detection performance for the area corresponding to the driving direction is poor when performing detection of an object existing at a medium/long distance. That is, in the case that the radar device is mounted on the front-side or rear-side of the vehicle, the performance of detecting the medium/long distance with respect to the driving direction of the vehicle may not be excellent due to the mounting position and direction of the radar device.

Accordingly, the present disclosure may provide the radar apparatus in which the transmission antenna performing detection for the medium/long range region is tilted and arranged to face the driving axis of the vehicle, so that the medium/long range detection region is parallel to the driving axis of the vehicle, thereby improving the detection performance for the blind spot region of the vehicle.

In addition, the present disclosure may provide the radar apparatus in which one of the plurality of transmission antennas is spaced apart from the other transmission antenna by a certain vertical distance in a vertical direction (direction perpendicular to the ground), the transmission signal is simultaneously transmitted from two transmission antennas spaced in the vertical direction, and the reflection signal received from a plurality of the receiving antenna is used. Accordingly, it is possible to obtain the horizontal and vertical information of the object with high resolution in both the long range detection mode and the short range detection mode.

Figure 2:
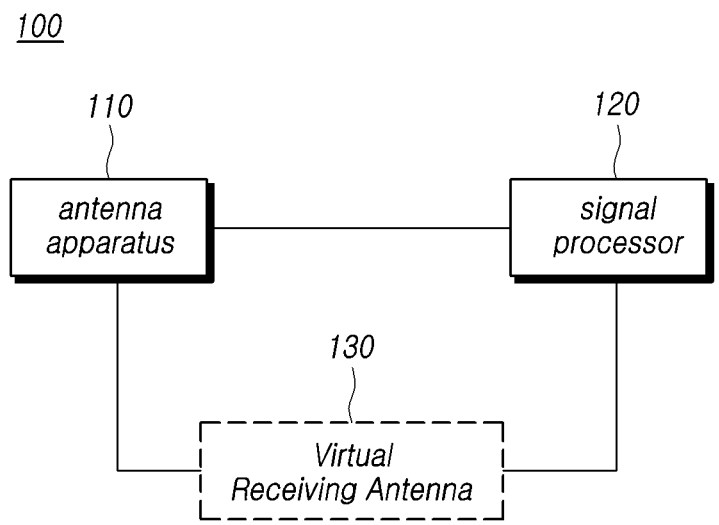
FIG. 2 is a schematic block diagram of a radar apparatus according to an embodiment of the present disclosure.

FIG. 2 is a schematic block diagram of a radar apparatus 100 according to an embodiment of the present disclosure.

Referring to FIG. 2, the radar apparatus 100 according to the embodiment of the present disclosure may be a radar device mounted on the front-side or the rear-side of the vehicle. The radar apparatus 100 may include the antenna unit 110 including a plurality of transmission antennas and a plurality of receiving antennas, and the signal processor or the signal processing unit 120 for transmitting a transmission signal through the antenna unit 110, receiving a reflection signal reflected by the object, and processing the received signal to obtain information about the object. Such a radar device may be also called a radar sensor.

The antenna unit 110 of the radar apparatus according to an embodiment of the present disclosure may include three transmission channels (transmission antennas) and four receiving channels (receiving antennas). This is one example and is not limited thereto.

Specifically, the antenna unit 110 may include the transmission antenna unit including two first transmission antennas and the second transmission antenna disposed between the two first transmission antennas, and the receiving antenna unit including one or more receiving antennas.

Here, each of the two first transmission antennas has a plurality of array antennas and is spaced apart from each other in the horizontal direction, and the second transmission antenna has one array antenna.

The one or more receiving antennas include a first receiving antenna, a second receiving antenna, a third receiving antenna, and a fourth receiving antenna that are sequentially spaced apart in the horizontal direction.

In the present disclosure, the two first transmission antennas may be tilted and arranged to face the driving axis of the vehicle at the position where the radar device is installed. Here, the driving axis of the vehicle at a position where the radar device is installed may indicate a straight line parallel to the driving center axis of the vehicle or the longitudinal center axis of the vehicle perpendicular to the lateral direction of the vehicle, that is, the straight line perpendicular to the lateral direction of the vehicle in the position where the radar device is mounted.

The signal processing unit 120 or signal processor of the radar apparatus of the present disclosure may implement the detection modes including the first detection mode corresponding to a medium/long range detection mode and the second detection mode corresponding to a short range detection mode. The signal processing unit 120 may, in each detection mode, transmit a transmission signal through a transmission antenna unit and receive the reflection signal of the transmission signal reflected by an object, and process the received reflection signal to acquire information about the object.

Referring to FIG. 2, the signal processing unit 120 according to an embodiment of the present invention may efficiently distribute signal processing that requires a large amount of computation to the first processing unit and the second processing unit, thereby reducing costs and the hardware size.

The first processing unit included in the signal processing unit 120 is a pre-processor for the second processing unit, and may acquire transmission data and receiving data, and control to generate transmission signals in the oscillation unit based on the obtained transmission data, synchronize transmission data and receiving data, and perform the frequency conversion for the transmission data and receiving data.

The second processing unit is a post-processor that performs actual processing using the processing results of the first processing unit. The second processing unit may perform the constant false alarm rate (CFAR) calculation, tracking calculation, and target selection calculation based on the received frequency-converted data from the first processing unit, and may extract the angle information, the speed information and the distance information on the target.

The first processing unit may perform frequency transform after buffering the obtained transmission data and the obtained receiving data in a unit sample size that can be processed per period. The frequency transform performed by the first processing unit may include a Fourier transform such as a Fast Fourier Transform (FFT).

The second processing unit may perform a second Fourier transform on the first Fourier transform (FFT) signal generated by the first processing unit. The second Fourier transform may be, for example, a discrete Fourier transform (DFT). Also, the DFT may be a chirp-discrete Fourier transform (Chirp-DFT) among DFTs.

The second processing unit may acquire a frequency value corresponding to the second Fourier transform length (K) through the second Fourier transform such as Chirp-DFT, and calculate the bit frequency having the largest power during each chirp cycle based on the obtained frequency value. The second processing unit may detect the object by obtaining speed information and distance information of the object based on the calculated bit frequency.

Figure 5:
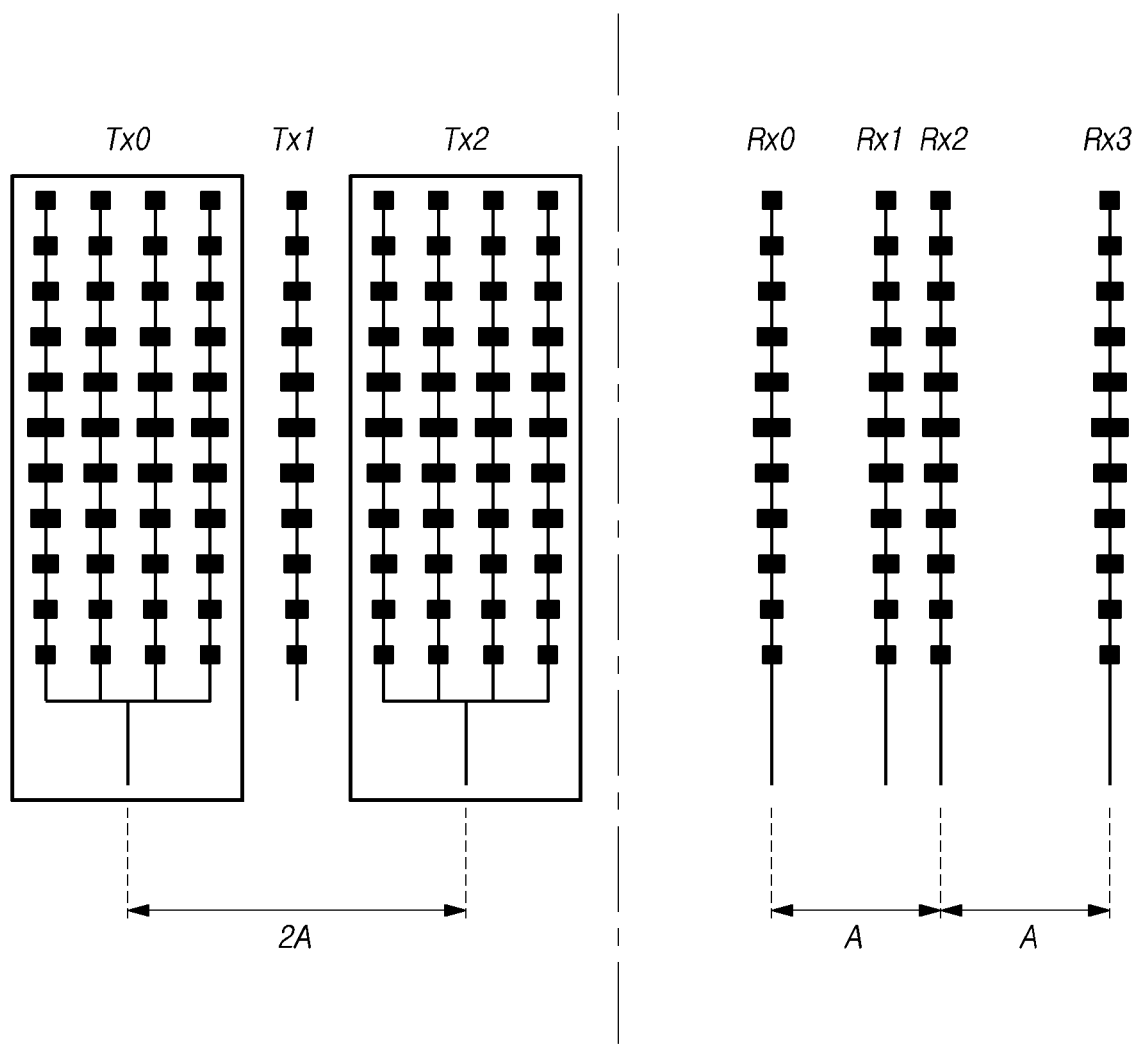
FIGS. 5 and 6 illustrate an arrangement of a plurality of transmission antennas and a plurality of receiving antennas included in the radar apparatus according to an embodiment of the present disclosure.
Figure 6:
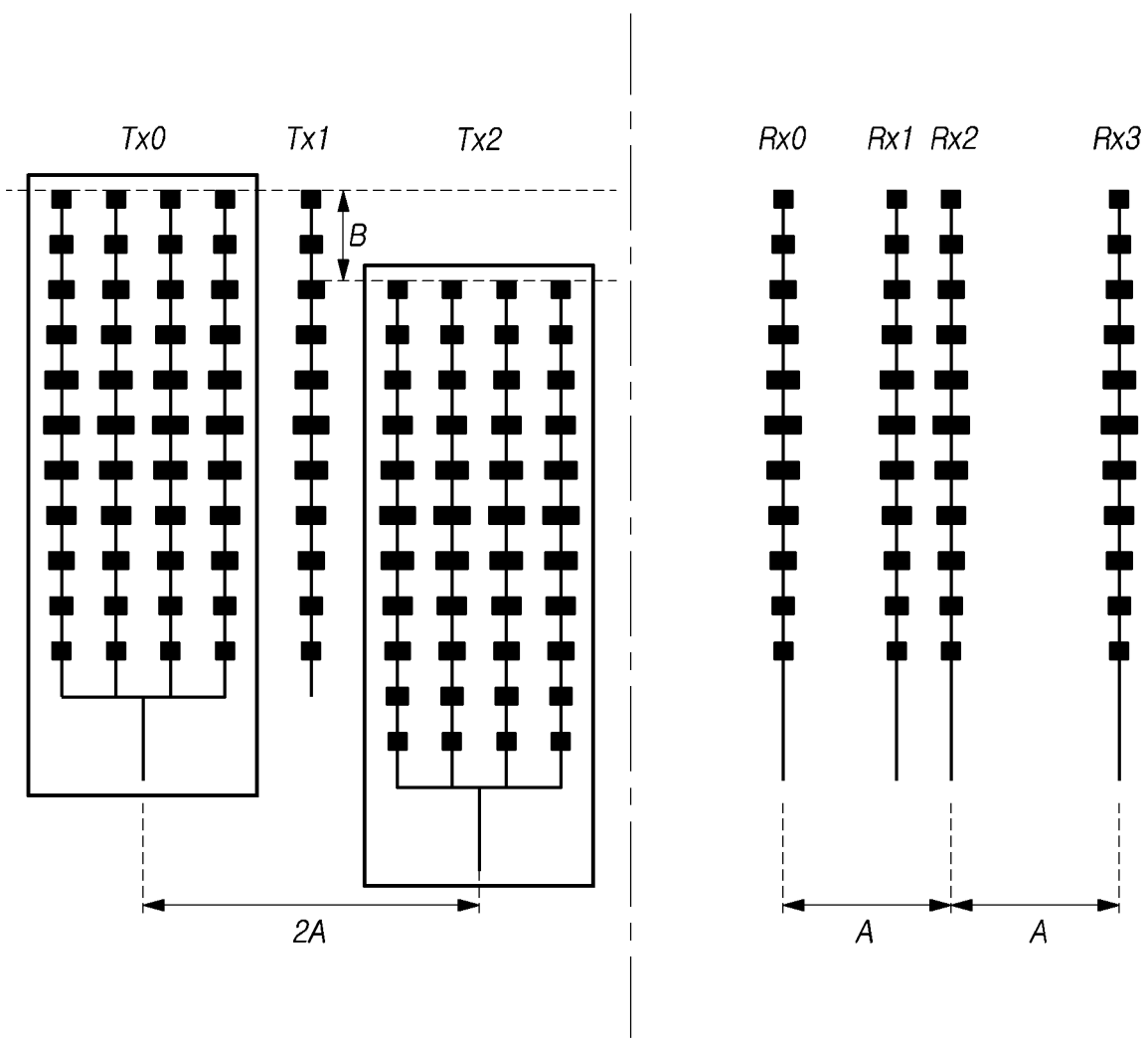

Meanwhile, the radar device according to the present disclosure may include the antenna unit structure as shown in FIG. 5 or 6, and the signal processing unit 120 may be configured to implement a specific signal transmission and reception method and the information acquisition method using the same in order to acquire vertical and horizontal information of an object in the medium/long range detection mode and the short range detection mode. This will be described in more detail below.

In addition, the signal processing unit 120 includes an oscillation unit that generates transmission signals for one transmission channel allocated to a transmission antenna or multiple transmission channels allocated to a plurality of transmission antennas. As an example, the oscillation unit may include a voltage-controlled oscillator (VCO), an oscillator, or the like.

The signal processing unit 120 may include a low noise amplifier (LNA) that amplifies the reflection signal received through four receiving antennas (i.e., four receiving channels) and a mixing unit (Mixer) that mixes the low noise-amplified receiving signal, an amplifier for amplifying the mixed receiving signal, a converter (ADC: Analog Digital Converter) for digitally converting the amplified receiving signal to generate receiving data.

The antenna unit 110 in the radar apparatus 100 according to an embodiment of the present invention may include a plurality of transmission antennas and a plurality of receiving antennas, and each of the transmission antenna and the receiving antenna may be an array antenna in which a plurality of transmission/receiving elements are connected in series by a transmission line, but is not limited thereto.

Each of the antennas used in the present embodiment may be extended to have a certain directionality, and the extension direction may mean a direction in which the antenna is extended based on a transmission port connected to the signal processing unit 120.

The radar device of the present disclosure is a corner radar device mounted at the corner of a vehicle, for example, the front-side or the rear-side of the vehicle, and the area detected by the radar device of the present disclosure will be described with reference to FIGS. 3 and 4.

Figure 3:
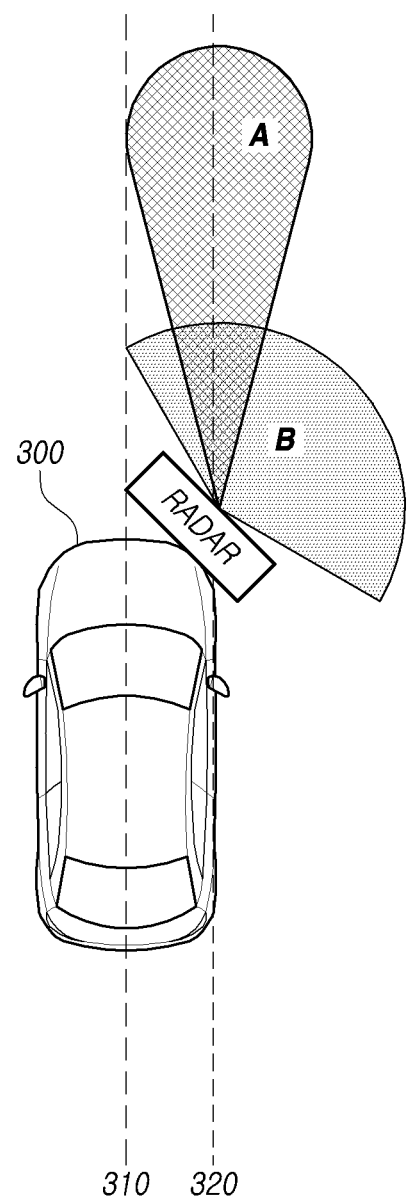
FIG. 3 is a figure illustrating an area detected by an antenna unit or an antenna device when the radar apparatus according to an embodiment of the present disclosure is mounted on the vehicle.

FIG. 3 is a figure illustrating an area detected by an antenna unit or an antenna device when the radar apparatus according to an embodiment of the present disclosure is mounted on the vehicle.

In the embodiment according to FIG. 3, the radar apparatus is mounted on the right-side in front of the vehicle. When the second detection mode corresponding to the short range detection mode is executed in the radar apparatus of the present disclosure, the transmission signal is transmitted through the second transmission antenna. Since the second transmission antenna is a one-row array antenna, the radar apparatus can detect a region B, which is a wide range of the front right side of the vehicle.

Meanwhile, when the first detection mode corresponding to the medium/long range detection mode is executed in the radar device of the present disclosure, the transmission signal is transmitted using the first transmission antenna. Since the first transmission antenna has a plurality of antenna arrays, the beam of the transmission signal is narrow, but can travel to far distance. In particular, the first transmission antenna of the radar device of the present disclosure is tilted to face the driving axis of the vehicle at the position where the radar device is installed. Here, the driving axis of the vehicle at the position where the radar device is installed may be defined as a straight line 320 parallel to the driving center axis of the vehicle or the longitudinal center axis 310 of the vehicle, which straight line 320 is perpendicular to the lateral direction of the vehicle at the position where the radar device is mounted.

The corner radar according to the present embodiment is installed in an oblique diagonal direction with respect to the traveling direction of the vehicle in the front-side or rear-side of the vehicle. That is, the corner radar may be installed obliquely toward the center direction of the area B in FIG. 3.

In the present embodiment, despite the oblique installation of the corner radar, the two first transmission antennas may be arranged on a plane perpendicular to the vehicle driving axis, thereby forming beamforming toward the vehicle driving direction.

Therefore, in the present disclosure, the configuration that the two first transmission antennas are tilted to face the driving axis of the vehicle may mean that the two transmission antennas are disposed in a plane perpendicular to the driving axis of the vehicle so as to form a beamforming in the vehicle traveling direction despite the oblique installation angle of the corner radar.

That is, as illustrated in FIG. 3, the beam of the transmission signal transmitted from the first transmission antenna may be formed to direct to the traveling direction of the vehicle.

Meanwhile, as will be described below, the two first transmission antennas may include a plurality of array antennas extending in the vertical direction perpendicular to the ground.

In addition, the two first transmission antennas may be arranged spaced apart from each other by a first vertical distance in a vertical direction perpendicular to the ground.

The first transmission antenna included in the radar device of the present disclosure is mounted at a corner of the vehicle, but tilted toward the front of the vehicle, so that it is possible to detect a long distance area in the driving lane or driving direction of the vehicle. Accordingly, it is possible to secure the stable performance for the function of a driver assistance system such as the lane change assistance (LCA) system.

In FIG. 3, the radar device of the present disclosure is described as being mounted on the front right side of the vehicle, but the mounting position is not limited to this, as long as the short range detection at a corner of the vehicle and the long range detection in the driving direction in front of the vehicle are possible. For example, the radar device may be mounted on the front left side of the vehicle, and in this case, the radar device can detect the area around the front left lane in the driving direction of the vehicle in the medium/long range detection mode.

Figure 4:
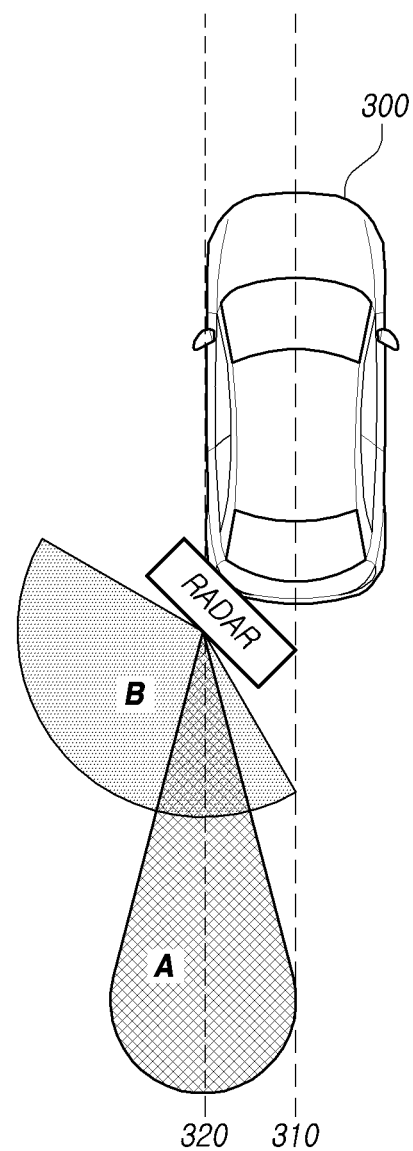
FIG. 4 is a figure illustrating an area detected by an antenna unit or an antenna device when the radar apparatus according to another embodiment of the present disclosure is mounted on a vehicle.

In the embodiment according to FIG. 4, the radar apparatus is mounted on the left-side of the rear of the vehicle. When the second detection mode corresponding to the short range detection mode is executed in the radar apparatus of the present disclosure, the transmission signal is transmitted through the second transmission antenna. Since the second transmission antenna is a one-row array antenna, the radar apparatus can detect a region B, which is a wide range of the rear left-side of the vehicle.

Meanwhile, when the first detection mode corresponding to the medium/long range detection mode is executed in the radar device of the present disclosure, the transmission signal is transmitted using the first transmission antenna. Since the first transmission antenna has a plurality of antenna arrays, the beam of the transmission signal is narrow, but can travel to far distance. In particular, the first transmission antenna of the radar device of the present disclosure is tilted rearward to face the driving axis of the vehicle at the position where the radar device is installed. Here, the driving axis of the vehicle at the position where the radar device is installed may be defined as a straight line 320 parallel to the driving center axis of the vehicle or the longitudinal center axis 310 of the vehicle, which straight line 320 is perpendicular to the lateral direction of the vehicle at the position where the radar device is mounted. That is, as illustrated in FIG. 4, the beam of the transmission signal transmitted from the first transmission antenna may be formed to face the opposite direction of the driving direction of the vehicle.

The first transmission antenna included in the radar device of the present disclosure is mounted at a corner of the vehicle, but tilted toward the rear of the vehicle, so that it is possible to detect a long distance area in the driving lane or driving direction behind the vehicle. Accordingly, it is possible to secure the stable performance for the function of a driver assistance system such as the lane change assistance (LCA) system.

In FIG. 4, the radar device of the present disclosure is described as being mounted on the rear left-side of the vehicle, but the mounting position is not limited to this, as long as the short range detection at a corner of the vehicle and the long range detection in the driving direction in rear of the vehicle are possible. For example, the radar device may be mounted on the rear right-side of the vehicle, and in this case, the radar device can detect the area around the rear right lane in the driving direction of the vehicle in the medium/long range detection mode.

FIGS. 5 and 6 illustrate the examples of an arrangement of a plurality of transmission antennas and a plurality of receiving antennas included in the radar apparatus according to an embodiment of the present disclosure.

In the present disclosure, the two first transmission antennas are tilted and arranged to face the driving axis of the vehicle at the position where the radar device is installed as described above.

In the antenna structure according to FIG. 5, the receiving antenna unit includes four receiving antennas of the first receiving antenna (Rx0), the second receiving antenna (Rx1), the third receiving antenna (Rx2) and the fourth receiving antenna (Rx3) which are sequentially spaced apart in the horizontal direction.

In one embodiment, the signal transmitted from the first transmission antenna is reflected by the object. Similar to the first transmission antennas, the receiving antennas (e.g., Rx0, Rx2 and Rx3) for receiving the reflection signal may be tilted toward the driving axis of the vehicle at a position where the radar device is installed.

In one embodiment, the first receiving antenna (Rx0) and the fourth receiving antenna (Rx3) are respectively spaced apart by the first horizontal distance A from the third receiving antenna (Rx2).

In one embodiment, each of the first receiving antenna (Rx0) to the fourth receiving antenna (Rx3) may be configured with one array antenna. Alternatively, each receiving antenna may be configured with a larger number of array antennas than one array antenna.

In addition, the transmission antenna unit may include a total of three transmission antennas. Specifically, the transmission antenna unit includes a first-1 transmission antenna (Tx0) and a first-2 transmission antenna (Tx2) each of which is configured with four array antennas, and a second transmission antenna (Tx1) as one array antenna.

In one embodiment, the first-1 transmission antenna (Tx0) and the first-2 transmission antenna (Tx2) may be spaced apart by a second horizontal distance 2A corresponding to twice the first horizontal distance in the horizontal direction.

Each of the first-1 transmission antenna (Tx0) and the first-2 transmission antenna (Tx2) may be configured such that four array antennas are connected to the same feeding line to simultaneously transmit transmission signals. However, each first transmission antenna does not necessarily need to be composed of four array antennas, and may be composed of one or more array antennas according to a required resolution or resolution.

In general, the larger the aperture of the transmission antenna is, the sharper the transmission beam becomes and the higher the linearity is. Therefore, it is possible to further improve the straightness and the sensing distance of the transmission signal by setting the number of array antennas of each of the first-1 transmission antenna (Tx0) and the first-2 transmission antenna (Tx2) used in the medium/long range detection mode to 4.

In addition, the second transmission antenna (Tx1) is also not necessarily composed of one array antenna, and may be composed of one or more array antennas.

The second receiving antenna (Rx1) and the third receiving antenna (Rx2) may be arranged to be spaced apart by one-half distance (0.5λ) of the transmission signal wavelength in the horizontal direction. In addition, the distance between the four array antennas constituting each of the first transmission antennas may also be arranged to be spaced apart by a half distance (0.5λ) of the wavelength of the transmission signal.

Thus, it has an effect of removing angle ambiguity due to the grating lobe by setting the horizontal distance between the second receiving antenna (Rx1) and the third receiving antenna (Rx2) to a half of the transmission signal wavelength (0.5λ). That is, since the distance between the receiving antennas is more than a half of the transmission signal wavelength (0.5λ), it is possible to minimize the angle uncertainty due to the grating lobe by arranging the horizontal distance between the second receiving antenna (Rx1)

and the third receiving antenna (Rx2) as 0.5λ and compensating by comparing the angle information extracted from the two channels.

In one embodiment, in the antenna unit of the radar apparatus of the present disclosure, the horizontal distance 2A between two transmission antennas simultaneously transmitting transmission signals by code division, that is, the first-1 transmission antenna (Tx0) and the first-2 transmission antenna (Tx2) may be same as the horizontal distance 2A between two receiving antennas on the most two sides among the four receiving antennas constituting the receiving antenna unit, that is, the first receiving antenna (Rx0) and the fourth receiving antenna (Rx3).

According to this arrangement, as described below, the entire aperture of the entire receiving antenna including the virtual receiving antenna formed in the receiving antenna unit and the real receiving antenna as the actual receiving antenna can be expanded according to code division transmission, thereby improving the resolution for horizontal information in the medium/long range detection mode. The formation of the virtual receiving antenna and the expansion effect of aperture will be described in more detail with reference to FIGS. 7 to 9 below.

Furthermore, the horizontal distance 2A between the first-1 transmission antenna (Tx0) and the first-2 transmission antenna (Tx2) transmitting the signal by code division is set to be same as the horizontal distance of 2A between the first receiving antenna (Rx0) and the fourth receiving antenna (Rx3), so that it is possible to maintain the transmission beam to be sharp so as to improve the detection performance of the radar.

In addition, according to the above-described antenna arrangement, it is possible to improve the horizontal detection resolution in both detection modes by forming a grating lobe deteriorating the performance of the antenna far from the position of the main beam or main lobe.

FIG. 6 illustrates another example of an arrangement of a plurality of transmission antennas and a plurality of receiving antennas included in the radar apparatus according to another embodiment of the present disclosure.

In one embodiment, the antenna unit 110 of the present disclosure may include the transmission antenna unit including two first transmission antennas spaced apart from each other by a first vertical distance B in a direction perpendicular to the ground, and the second transmission antenna disposed in the same vertical position as any one of the two first transmission antennas. In addition, the antenna unit 110 may include the receiving antenna unit including one or more receiving antennas (for example, Rx0, Rx1, Rx2, Rx3 in FIG. 6) disposed in the same vertical position as any one of the first transmission antennas.

According to the present disclosure, the two first transmission antennas may be tilted and disposed toward the driving axis of the vehicle at the position where the radar device is installed, as described above.

In one embodiment, the signal transmitted from the first transmission antenna is reflected by the object, and the receiving antenna (e.g., Rx0, Rx2, Rx3) receiving the reflection signal may be arranged to be tilted toward the driving axis of the vehicle at a position where a radar device is installed, similar to the first transmission antennas.

In the embodiment according to FIG. 6, the transmission antenna unit may include the first-1 transmission antenna (Tx0) and the second transmission antenna (Tx1) having the same vertical position as the receiving antennas, and the first-2 transmission antenna (Tx2) spaced apart by the first vertical distance B in the vertical direction from the first-1 transmission antenna. In addition, the receiving antenna unit may include one or more receiving antennas arranged at the same vertical position as the first-1 transmission antenna (Tx0).

That is, the first-2 transmission antenna (Tx2) is spaced apart from the first-1 transmission antenna (Tx0) and the second transmission antenna Tx1 by the first vertical distance B in the first direction. As described above, by arranging at least two of the transmission antennas constituting the transmission antenna unit at a predetermined distance (vertical distance) in the vertical direction perpendicular to the ground, it is possible to accurately measure the vertical direction (Elevation) information of the object. At this case, the vertical distance B may be determined in consideration of the frequency of the transmission signal or the measurement accuracy of the vertical direction information of the object.

In one embodiment, the radar apparatus according to the embodiment may transmit the code-divided transmission signals from the first-1 transmission antenna (Tx0) and the first-2 transmission antenna (Tx2) in the first detection mode for medium/long range detection, and may receive the reflection signals from the first receiving antenna (Rx0), the third receiving antenna (Rx2) and the fourth receiving antenna (Rx3) included in the receiving antenna unit. Furthermore, the radar apparatus may transmit the transmission signal through the second transmission antenna (Tx1) in the second detection mode for short-range detection, and may receive the reflection signals from all receiving antennas included in the receiving antenna unit.

The signal processing unit 120 of this embodiment may process the transmission signal and the received reflection signal to calculate location information of the object. More specifically, the signal processing unit 120 may acquire the vertical information such as the elevation angle of the object and medium/long range horizontal information such as the azimuth angle of the object at a medium or long distance by using the code-divided transmission signal transmitted from the first-1 transmission antenna (Tx0) and the first-2 transmission antenna (Tx2) and the receiving signal received through the first receiving antenna (Rx0), the third receiving antenna (Rx2) and the fourth receiving antenna (Rx3).

In one embodiment, the signal processing unit 120 may obtain the short range horizontal information such as an azimuth angle of an object at a short distance by using the transmission signal transmitted through a single second transmission antenna (Tx1) and the receiving signal received from all of the receiving antennas.

Figure 7:
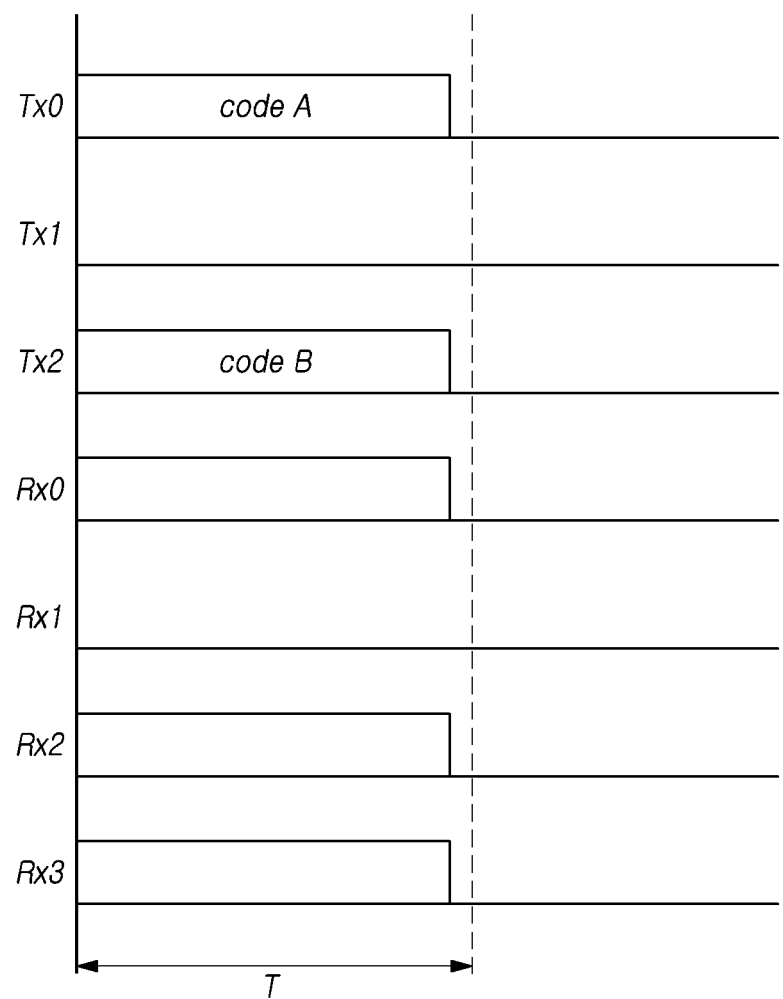
FIG. 7 is a diagram for explaining signal timing in the case of detecting an object existing in a medium/long distance using the radar apparatus according to an embodiment of the present disclosure.
Figure 8:
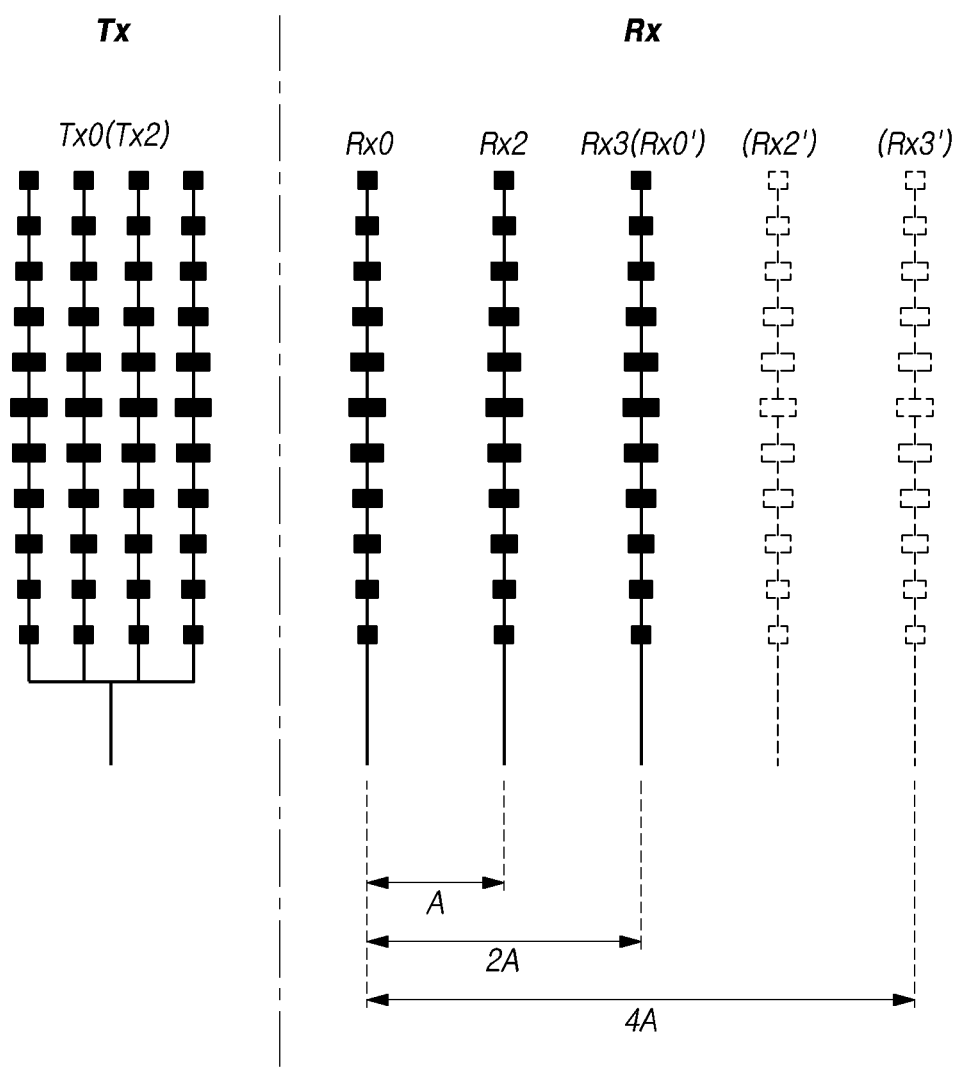
FIG. 8 is a diagram illustrating an equivalent state of the transmission/receiving antenna in the medium/long range detection mode when detecting horizontal information using the radar apparatus according to an embodiment of the present disclosure.

FIGS. 7 and 8 are diagrams explaining the case for detecting the horizontal information (Azimuth) using the radar device according to the present embodiment, in particular, the signal timing diagram (FIG. 7) in the medium/long range detection mode, and equivalent state diagram (FIG. 8) for the transmission and receiving antenna in that case.

In order to measure the horizontal information of an object at a medium or long distance by the radar apparatus according to the present invention, in the transmission mode, the first-1 transmission antenna (Tx0) and the first-2 transmission antenna (Tx2) simultaneously transmit the code-divided transmission signals. On the other hand, in the receiving mode for receiving the signal reflected from the object, the horizontal information of the medium-to-long distance object may be obtained by using information received from all of the first, third, and fourth receiving antennas Rx0, Rx2, and Rx3 included in the receiving antenna unit.

In the following specification, a total of three transmission antennas (Tx0, Tx1, Tx2) included in the transmission antenna unit may also be represented as transmission channels, and each of four receiving antennas (Rx0, Rx1, Rx2, Rx3) included in the receiving antenna unit may also be represented as the receiving channel.

Therefore, the radar apparatus according to the present disclosure may utilize two transmission channels and three receiving channels to acquire horizontal information in the medium/long range detection mode. In particular, in the transmission mode, the transmission signals transmitted by dividing the code in the first-1 transmission antenna (Tx0) and the first-2 transmission antenna (Tx2) among the two transmission channels are used, and in the receiving mode, all information received through three receiving channels (that is, three receiving channels of Rx0, Rx2, and Rx3) is used.

As shown in FIG. 7, the transmission signal with the first code (Code A) and the transmission signal with the second code (Code B) are simultaneously transmitted by turning on the first-1 transmission antenna (Tx0) and the first-2 transmission antenna (Tx2) for a certain interval within one detection period (0 to T). Meanwhile, during the same detection period, all three receiving antennas Rx0, Rx2, and Rx3 receive signals, and by analyzing the received signals, horizontal information (width, etc.) of an object at a medium/long distance may be obtained.

The equivalent state diagram of FIG. illustrates the arrangement state of the receiving antennas in the case that two transmission antenna channels for code division transmission are fixed as one, and the degree of aperture of the radar device may be represented. In FIG. 8, the positions of the first transmission antennas (Tx0 and Tx2) have the same vertical height with respect to the ground.

At this case, since the first-1 transmission antenna (Tx0) and the first-2 transmission antenna (Tx2) to which the code-divided transmission signal is transmitted may be spaced apart from each other by 2A in the horizontal direction, according to the viewpoint of the receiving antenna receiving the reflection signal reflected from the object, it has the same effect that the reflection signals with the same type divided into the first code and the second code are received by being spatially shifted by 2A in the horizontal direction.

Here, as a concept different from the actual receiving antenna, a receiving antenna virtually present due to horizontal separation of a transmission antenna that simultaneously transmits a signal may be expressed as a virtual receiving antenna.

In FIG. 8, when viewed based on the first-1 transmission antenna (Tx0), the first receiving antenna (Rx0), the third receiving antenna (Rx2) and the fourth receiving antenna (Rx3) among the receiving antennas may be the real receiving antenna actually present.

In addition, since the first-1 transmission antenna (Tx0) and the first-2 transmission antenna (Tx2) are separated by a horizontal distance of 2A, a first virtual receiving antenna (Rx0'), a second virtual receiving antenna (Rx2'), and a third virtual receiving antenna (Rx3'), which are a total of three virtual receiving antennas having the same arrangement form as the real receiving antenna may be generated at a position spaced apart by 2A from the real true receiving antennas.

As a result, the formation position of the first virtual receiving antenna may be exactly overlapped with the position of the fourth receiving antenna Rx3. In FIG. 8, the real receiving antenna is indicated by a solid line, and the virtual receiving antenna is indicated by a dotted line.

Accordingly, as shown in FIG. 8, at the receiving end, the first real receiving antenna (RX0), the second real receiving antenna (Rx2), the third real receiving (Rx3), the first virtual receiving antenna (Rx0'), the second virtual receiving antenna (Rx2') and the third virtual receiving antenna (Rx3') overlapped therewith are sequentially arranged from the left end. And, the horizontal spacing between each real/virtual receiving antenna is equally arranged as A.

As a result, the entire opening of the receiving end, that is, the horizontal distance between the first real receiving antenna (Rx0) disposed at one end and the third virtual receiving antenna (Rx3') disposed at the other end may be 4A. Therefore, by using the radar device according to the present disclosure, the entire aperture of the receiving part may be expanded to 4A, landmark and accordingly, it is possible to improve resolution for horizontal information in the medium/long range detection mode.

In general, the radar device performs the object detection function for detecting the distance to the object, the speed of the object and the orientation of the object by using the receiving signal received through a plurality of receiving antennas. At this case, it is desirable to have an antenna structure of an "extended aperture structure" that widens the receiving antenna spacing in order to increase the accuracy of object detection (i.e., to increase the resolution). That is, since the distance between one end and the other end of the receiving antenna may be defined as the aperture, it is one of the very important performance factors of the radar device to enlarge the aperture of the receiving antenna to have the extended aperture performance.

In this way, the position where the grating lobe at the receiving end occurs may be located to be closer to the center position where the main beam is located by providing the antenna structure of the extended aperture structure. Accordingly, in the radar apparatus according to an embodiment of the present disclosure, it may be provided with the "virtual aperture structure" or "virtual antenna structure" in order that the location where the grating lobe occurs may be far from the center location where the main beam is located, that is, in order to suppress the grating lobe.

As described above, in order to have the virtual antenna structure, the radar device 100 according to an embodiment of the present disclosure, as illustrated in FIG. 2, may further include the virtual receiving antenna 130 that controls a plurality of virtual receiving antennas to be formed. The virtual receiving antenna 130 may perform signal processing to generate a signal having a predetermined phase difference determined according to the interval of the receiving antenna, based on the signal received by the real receiving antenna.

That is, the virtual receiving antenna 130 may perform the signal processing to generate the virtual signal (with a phase difference determined based on the actually received signal), as if the signal was received through the virtual receiving antenna virtually arranged at a position where the real receiving antenna is not disposed.

In this specification, the expression that "the virtual receiving antenna is formed" may have the same meaning as that "the receiving signal not actually received is formed". In this sense, the arrangement structure (interval, number, etc.) of the virtual receiving antenna may have the same meaning as the structure (interval, number, etc.) in which the receiving signals not actually received are created. By the virtual receiving antenna 130, in addition to the plurality of real receiving antennas, the receiving antenna part may have the receiving antenna structure in which a plurality of virtual receiving antennas are virtually present. As described above, an antenna structure in which a plurality of virtual receiving antennas are virtually further present at the receiving antenna part may be expressed as an "antenna structure having a virtual aperture structure".

As described above, in order to acquire the horizontal direction information in the medium/long range detection mode, the signal processing unit 120 of the radar apparatus according to the present invention may simultaneously transmit the code-divided transmission signal through the first-1 transmission antenna Tx0 and the first-2 transmission antenna Tx2 which are spaced apart by the horizontal distance 2A, and may receive the reflection signal through the first receiving antenna, the third receiving antenna, the fourth receiving antenna (or the first virtual receiving antenna), the second virtual receiving antenna, and the third virtual receiving antenna which are sequentially spaced by the horizontal distance A. By using such a transmission signal and a received reflection signal, the horizontal information (azimuth angle, etc.) of the target at a medium to long distance can be measured with excellent resolution.

Figure 9:
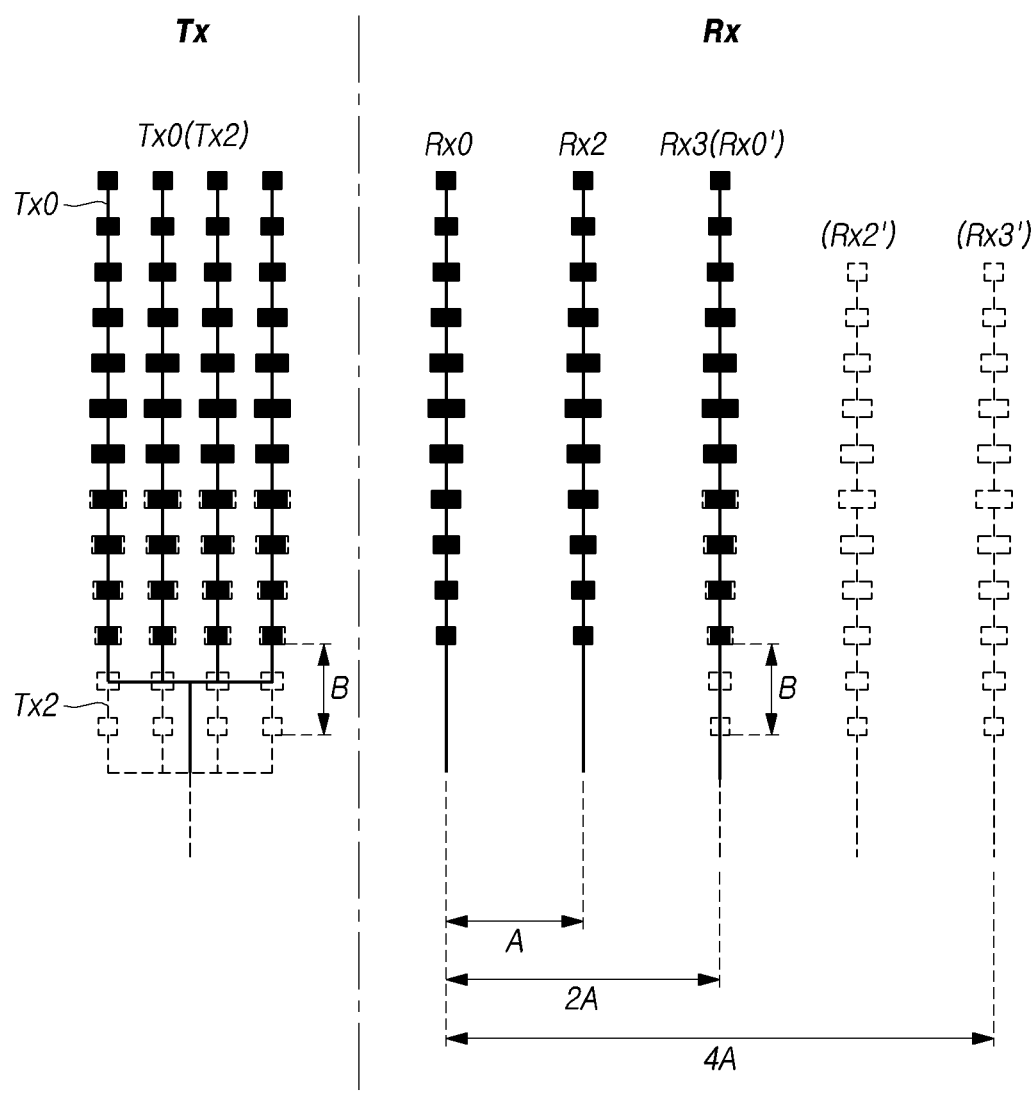
FIG. 9 is a diagram illustrating an equivalent state of a transmission/receiving antenna in a medium/long range detection mode when detecting vertical information using the radar apparatus according to another embodiment of the present disclosure.

As described above, the radar device according to the present disclosure may have the antenna arrangement structure as shown in FIG. 5, and may have the signal transmission and receiving configuration as shown in FIGS. 8 and 9, thereby can precisely measure the horizontal information of a medium/long distance object by securing an extended aperture performance.

FIG. 9 is a diagram illustrating an equivalent state of a transmission/receiving antenna when detecting vertical information using the radar apparatus according to another embodiment of the present disclosure.

In the radar apparatus according to the present embodiment, the code-divided signal is simultaneously transmitted using the first-1 transmission antenna (Tx0) and the first-2 transmission antenna (Tx2), which are two transmission antennas spaced apart by the vertical distance B in the vertical direction. In addition, the vertical information of the target, such as the elevation angle, can be obtained by using such a transmission signal and the reflection signal received from the plurality of receiving antennas.

That is, in order to acquire the vertical information of the target, the signal processing unit 120 may, as in the medium/long range detection mode, simultaneously transmit the transmission signal having one code (Code A) and the transmission signal having a second code (Code B) by turning on the first-1 transmission antenna Tx0 and the first-2 transmission antenna Tx2 for a certain period within one detection cycle 0~T. In addition, the signal processing unit 120 may receive the reflection signal from all three receiving antennas Rx0, Rx2 and Rx3, and may analyze the received reflection signals to obtain vertical information (height, etc.).

FIG. 9 is an equivalent state diagram of a transmission and receiving antenna when detecting the vertical information, in which the horizontal position of the first-2 transmission antenna Tx2 transmitting the transmission signal of the second code is expressed to be same as the horizontal position of the first-1 transmission antenna based on the position of the first-1 transmission antenna Tx0 for transmitting the transmission signal of the first code in order to illustrate only the vertical positional relationship.

As shown in the right side of FIG. 9, a total of three real receiving antennas (Rx0, Rx2, Rx3) and three virtual receiving antennas (Rx0', Rx2', Rx3') are formed at the receiving part, and the third real receiving antenna Rx3 and the first virtual receiving antenna Rx0' are exactly overlapped in the horizontal direction, but are spaced apart by the vertical distance B in the vertical direction.

That is, if the code-divided transmission signals are simultaneously transmitted from the first-1 transmission antenna Tx0 and the first-2 transmission antenna Tx2 for vertical information detection, there may be sequentially arranged in the receiving part the first receiving antenna Rx0, the third receiving antenna Rx2, the third receiving antenna Rx3 and the first virtual receiving antenna Rx0', the second virtual receiving antenna Rx2' and the third virtual receiving antenna Rx3' overlapped therewith in the horizontal direction.

At this case, since the first-1 transmission antenna Tx0 and the first-2 transmission antenna Tx2 for transmitting the code-divided transmission signal are separated by the vertical distance B, the third receiving antennas Rx3 and the first virtual receiving antenna Rx0', which are horizontally overlapped in the center of the receiving part, may be spaced apart by the vertical distance B in the vertical direction.

Accordingly, a constant phase difference or amplitude difference occurs between receiving signals received in each received channel or between transmission signals and receiving signals per channel by the vertical distance separation.

Accordingly, it is possible to obtain vertical information such as the height of the object by comparing the phase difference or the amplitude difference of the signals for each receiving channel.

There may be difference in the path (progress distance) of the signals received in the two receiving channels (for example, the third receiving antenna and the first virtual receiving antenna) spaced apart by the vertical distance B in the vertical direction as shown in FIG. 9 in accordance with the height of the object. Therefore, the phase or magnitude of a signal received in each receiving channel may be changed due to this difference of the path.

Accordingly, the signal processing unit 120 of the radar device may acquire vertical information such as the height of the object by analyzing the phase or magnitude difference of signals received from both receiving channels.

As described with reference to FIGS. 7 and 8, the same transmission/receiving method may be used to acquire the horizontal information in the medium/long range detection mode. Accordingly, in order to acquire horizontal information in the medium/long distance detection, the signal processing unit 120 may perform phase correction according to the vertical separation of the signals received in each receiving channel in the equivalent antenna state as shown in FIG. 9 and then may perform processing for obtaining horizontal information. That is, the signal processing unit 120 first obtains the vertical information of the object as shown in FIG. 9 from the signal received at the receiving end through signal transmission and receiving as shown in FIG. 7, and then corrects the phase difference of the receiving signal according to the vertical separation, and then obtains the horizontal information of the medium/long distance object as described in FIG. 8.

Figure 10:
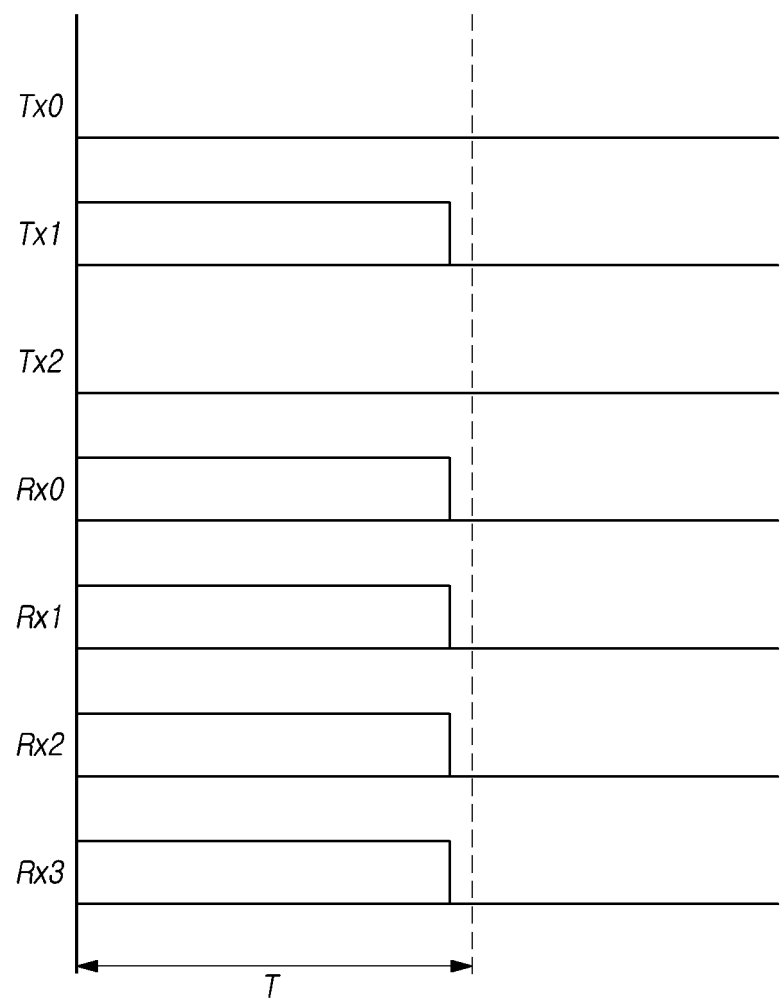
FIG. 10 is a diagram for explaining signal timing in the case of detecting the object existing at a short distance using the radar apparatus according to an embodiment of the present disclosure.
Figure 11:
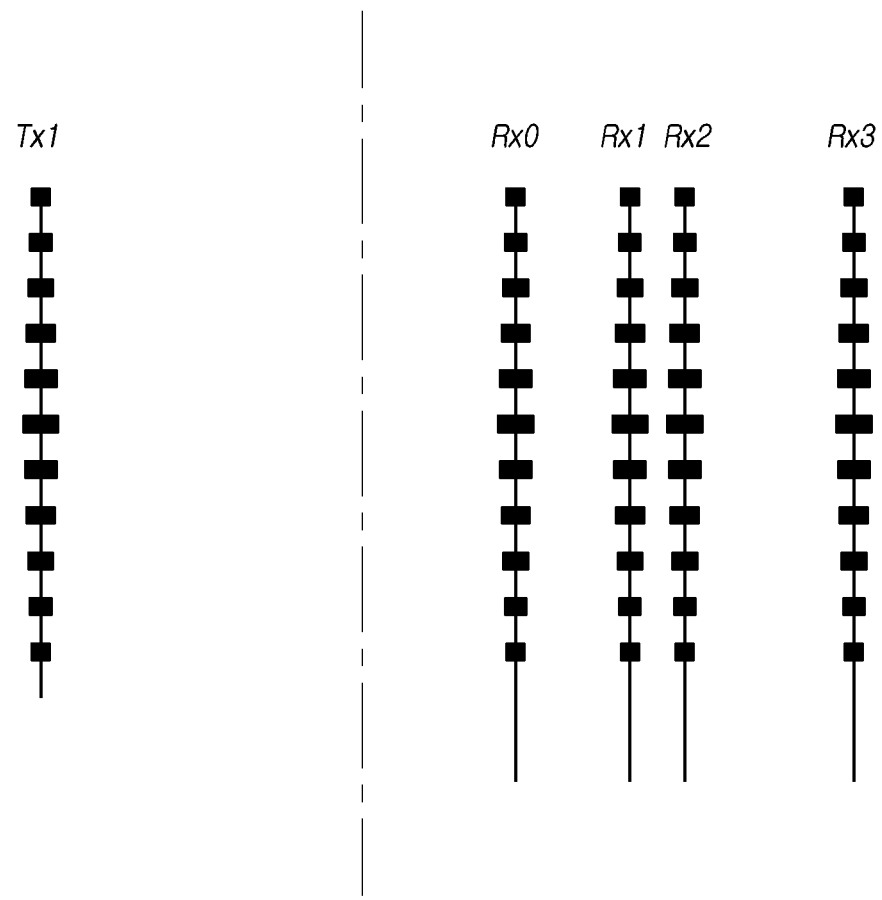
FIG. 11 is a diagram illustrating an equivalent state of a transmission/receiving antenna when detecting an object existing at the short distance by using the radar apparatus according to an embodiment of the present disclosure.

FIGS. 10 and 11 are diagrams for explaining the cases for detecting horizontal information in the antenna configuration according to the present embodiment, in particular, signal timing diagrams in the short range detection mode (FIG. 10) and equivalent state diagrams of the transmitting and receiving antennas in that case (FIG. 11).

As shown in FIG. 10, in the first detection mode which is the short range detection mode for detecting location information of the target at a short distance, the signal processing unit 120 in the radar apparatus according to the present embodiment may transmit the transmission signal using the second transmission antenna Tx1 disposed centrally among the three transmission antennas, and may receive the reflection signals from all four receiving antennas Rx0 to Rx3.

That is, as shown in FIG. 10, the second transmission antenna Tx1 may be turned on for a certain period within one detection period (0 to T) to transmit the transmission signal, and during the same detection period, four receiving antennas Rx0 to Rx3 may receive the reflection signals (all four receiving antennas are ON state).

The signal processor 120 may compare and analyze the receiving signal received from four antennas or four channels and the transmission signal transmitted from the second transmission antenna to obtain location information of the short-di stance object.

Referring to FIG. 11 which is the equivalent state diagram of the antenna in the short range detection mode, the aperture of the transmission part may be set to one array antenna in the second transmission antenna Tx1, so that the detection range of the short range detection mode can be expanded by forming the transmission signal pattern with a relatively wide angle.

In addition, there may be a possibility that the grating lobe is generated because the horizontal distance between each receiving antenna, that is, the horizontal distance A is 0.5λ or more. However, in the radar apparatus according to the present embodiment, the distance between the second receiving antenna Rx1 and the third receiving antennas Rx2 may be arranged to be 0.5λ, and the angle information extracted from the signals received from the two receiving antennas may be compared, so that it is possible to remove the ambiguity caused by the grating lobe.

The signal processing unit 120 and the virtual receiving antenna 130 included in the radar apparatus 100 according to the present embodiment as described above may be implemented as a partial module of a radar control device or ECU for performing the object identification function by the radar.

Such a radar control device or ECU may include a processor, a storage device such as a memory, and a computer program capable of performing a specific function, and the signal processing unit 120 and the virtual receiving antenna 130 and so on may be implemented as a software module capable of performing the specific corresponding function.

As described above with reference to FIGS. 7 to 11, it is possible to acquire vertical and horizontal information of the object with high precision or high resolution in both the medium/long range detection mode and the short range detection mode. Therefore, it is possible to accurately measure the vertical and horizontal information of the long-distance and short-distance objects without physical changes or additional devices of the radar device, thereby maximizing usability as the vehicle radar.

The various components according to the present disclosure described above may be embodied as computer readable codes on a medium in which a program is recorded. The computer-readable medium includes all types of recording devices in which data readable by a computer system is stored. Examples of computer-readable media include a hard disk drive (HDD), solid state disk (SSD), silicon disk drive (SDD), ROM, RAM, CD-ROM, magnetic tape, floppy disk, and optical data storage device. It also includes those implemented in the form of carrier waves (eg, transmission over the Internet).

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar apparatus comprising:
    an antenna apparatus configuring to include a transmission antenna unit including two or more first transmission antennas mounted in the rear-side or front-side of a vehicle and arranged to be spaced apart from each other in a horizontal direction, each of which has a plurality of array antennas and a second transmission antenna having one array antenna disposed between the two or more first transmission antennas, and a receiving antenna unit including one or more receiving antennas; and
    a signal processor configuring to transmit a transmission signal through the transmission antenna unit, receive a reflection signal reflected from an object through the receiving antenna, and process the received reflection signal to acquire information about the object;
    wherein the two or more first transmission antennas are tilted and arranged toward a driving axis of the vehicle at a position where the radar apparatus is mounted,
    wherein the receiving antenna unit includes a first receiving antenna, a second receiving antenna, a third receiving antenna, and a fourth receiving antenna that are sequentially spaced apart in the horizontal direction, and the first receiving antenna and the fourth receiving antenna are respectively spaced apart from the third receiving antenna by a first horizontal distance, such that the third receiving antenna is located at a horizontal center between the first receiving antenna and the fourth receiving antenna and the second receiving antenna is located between the first receiving antenna and the third receiving antenna.

2. The radar apparatus of claim 1, wherein the two or more first transmission antennas are spaced apart from each other by a second horizontal distance corresponding to twice the first horizontal distance in the horizontal direction.

3. The radar apparatus of claim 2, wherein the second receiving antenna and the third receiving antenna are spaced by a half distance (λ/2) of the wavelength of the transmission signal in the horizontal direction.

4. The radar apparatus of claim 1, wherein the two or more first transmission antennas are spaced apart from each other by a first vertical distance in a direction perpendicular to the ground.

5. The radar apparatus of claim 4, wherein the one or more receiving antennas are disposed in a same vertical position as any one of the first transmission antennas spaced apart from each other by the first vertical distance in the direction perpendicular to the ground.

6. The radar apparatus of claim 2, wherein the signal processor, in a first detection mode for obtaining information about the object at a medium or long distance, transmits a code-divided transmission signal from the two or more first transmission antennas and receives the reflection signal from the first receiving antenna, the third receiving antenna, and the fourth receiving antenna.

7. The radar apparatus of claim 1, wherein the signal processor, in a second detection mode for obtaining information about the object at a short distance, transmits the transmission signal from the second transmission antenna and receives the reflection signal from all receiving antennas included in the receiving antenna unit.

8. The radar apparatus of claim 1, wherein the one or more receiving antennas are tilted and arranged toward a driving axis of the vehicle at a position where the radar apparatus is mounted.

9. The radar apparatus of claim 1, wherein the plurality of array antennas included in each of the two or more first transmission antennas are spaced by a half distance ($\lambda/2$) of the wavelength of the transmission signal in the horizontal direction.

10. An antenna apparatus for a radar apparatus mounted in a rear-side or a front-side of a vehicle, the antenna apparatus comprising:
a transmission antenna unit configuring to include two or more first transmission antennas spaced apart from each other in a horizontal direction, each of which includes a plurality of array antennas, and a second transmission antenna having one array antenna disposed between the two or more first transmission antennas; and
a receiving antenna unit including one or more receiving antennas,
wherein the two or more first transmission antennas are tilted and arranged toward a driving axis of the vehicle at a position where the radar apparatus is mounted,
wherein the receiving antenna unit includes a first receiving antenna, a second receiving antenna, a third receiving antenna, and a fourth receiving antenna that are sequentially spaced apart in the horizontal direction, and the first receiving antenna and the fourth receiving antenna are respectively spaced apart from the third receiving antenna by a first horizontal distance such that the third receiving antenna is located at a horizontal center between the first receiving antenna and the fourth receiving antenna and the second receiving antenna is located between the first receiving antenna and the third receiving antenna.

11. The antenna apparatus of claim 10, wherein the two or more first transmission antennas are spaced apart from each other by a second horizontal distance corresponding to twice the first horizontal distance in the horizontal direction.

12. The antenna apparatus of claim 11, wherein the second receiving antenna and the third receiving antenna are spaced by a half distance ($\lambda/2$) of the wavelength of the transmission signal in the horizontal direction.

13. The antenna apparatus of claim 10, wherein the two or more first transmission antennas are spaced apart from each other by a first vertical distance in a direction perpendicular to the ground.

14. The antenna apparatus of claim 13, wherein the one or more receiving antennas are disposed in a same vertical position as any one of the first transmission antennas spaced apart from each other by the first vertical distance in the direction perpendicular to the ground.

15. The antenna apparatus of claim 10, wherein, in a first detection mode for obtaining information about the object at a medium or long distance, the two or more first transmission antennas transmit a code-divided transmission signal, and the first receiving antenna, the third receiving antenna, and the fourth receiving antenna receive the reflection signal.

16. The antenna apparatus of claim 10, wherein, in a second detection mode for obtaining information about the object at a short distance, the second transmission antenna transmits the transmission signal and all receiving antennas included in the receiving antenna unit receive the reflection signal.

17. The antenna apparatus of claim 10, wherein the one or more receiving antennas are tilted and arranged toward a driving axis of the vehicle at a position where the radar apparatus is mounted.

18. The antenna apparatus of claim 10, wherein the plurality of array antennas included in each of the two or more first transmission antennas are spaced by a half distance ($\lambda/2$) of the wavelength of the transmission signal in the horizontal direction.

* * * * *